(12) United States Patent
Fang et al.

(10) Patent No.: US 9,379,626 B2
(45) Date of Patent: Jun. 28, 2016

(54) POWER SUPPLY CIRCUIT FOR A PFC CONVERTER

(75) Inventors: Yuhong Fang, Naperville, IL (US);
Sanjaya Kumar Pradhan, Des Plaines, IL (US)

(73) Assignee: Koninklijke Philips Electronics N.V., Eindhoven (NL)

( * ) Notice: Subject to any disclaimer, the term of this patent is extended or adjusted under 35 U.S.C. 154(b) by 311 days.

(21) Appl. No.: 14/112,993

(22) PCT Filed: Apr. 20, 2012

(86) PCT No.: PCT/IB2012/052004
§ 371 (c)(1),
(2), (4) Date: Oct. 21, 2013

(87) PCT Pub. No.: WO2012/143906
PCT Pub. Date: Oct. 26, 2012

(65) Prior Publication Data
US 2014/0049175 A1  Feb. 20, 2014

Related U.S. Application Data

(60) Provisional application No. 61/478,098, filed on Apr. 22, 2011.

(51) Int. Cl.
*H05B 37/00* (2006.01)
*H02M 3/335* (2006.01)
*H02M 1/42* (2007.01)
*H02M 1/15* (2006.01)
*H02M 3/158* (2006.01)

(52) U.S. Cl.
CPC ........ *H02M 3/33546* (2013.01); *H02M 1/4225* (2013.01); *H05B 37/00* (2013.01); *H02M 1/15* (2013.01); *H02M 3/1582* (2013.01); *Y02B 70/126* (2013.01)

(58) Field of Classification Search
CPC ..... H05B 37/02; H05B 37/00; H02M 7/5387; H02M 3/33546
USPC ............ 315/205, 200 R, 159, 219, 244, 225, 315/209 R, 175, 247, 268; 363/21.09, 132, 363/133, 21.01, 24, 25, 134, 97, 98
See application file for complete search history.

(56) References Cited

U.S. PATENT DOCUMENTS

| 5,134,355 A | 7/1992 | Hastings |
|---|---|---|
| 2009/0027925 A1 | 1/2009 | Kanouda |

(Continued)

FOREIGN PATENT DOCUMENTS

| CN | 2364654 Y | 2/2000 |
|---|---|---|
| CN | 101860189 A | 10/2010 |

(Continued)

OTHER PUBLICATIONS

Fang, Yuhong et al "Transformer Driving Improvement in Buck-Boost PFC", IPCOM000134819D, Mar. 2006.

*Primary Examiner* — Lincoln Donovan
*Assistant Examiner* — Thomas Skibinski

(57) ABSTRACT

A PFC converter (100) is disclosed that includes a voltage rectifier circuit (126, 127, 153) and a voltage regulator circuit (81, 90, 33, 54). The PFC converter (100) also includes an inductor (140) having a plurality of auxiliary windings (141, 142) coupled to the voltage rectifier circuit (126, 27, 153) and the voltage regulator circuit (81, 90,33, 54). One of the auxiliary windings (142) is arranged to supply a start up voltage (V1), during a start up stage, using the voltage rectifier circuit (126, 127, 153) to the voltage regulator circuit (81, 90, 33, 54). Another of the auxiliary windings (141) is arranged to supply a voltage (V1), during a steady-state stage, using the voltage rectifier circuit (126, 127, 153) to the voltage regulator circuit (81, 90, 33, 54).

14 Claims, 2 Drawing Sheets

(56) References Cited

U.S. PATENT DOCUMENTS

2011/0305049 A1* 12/2011 Raptis .................. H02J 9/062
 363/34
2014/0292210 A1* 10/2014 Clauberg ............... H05B 37/02
 315/159

FOREIGN PATENT DOCUMENTS

| DE | 29605087 U1 | 8/1996 |
|---|---|---|
| DE | 10226213 A1 | 12/2003 |
| EP | 0439240 A2 | 7/1991 |
| WO | 2003107724 A1 | 12/2003 |

* cited by examiner

Fig. 3
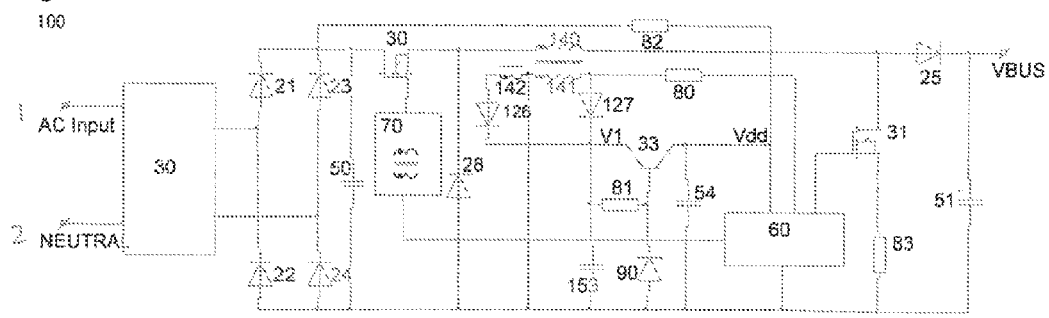
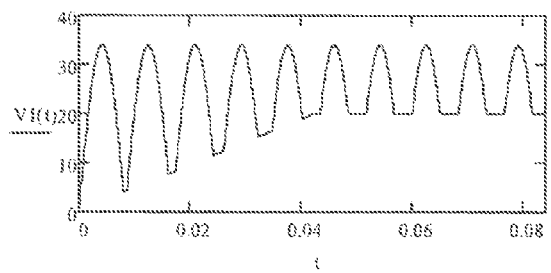
Fig. 4

POWER SUPPLY CIRCUIT FOR A PFC CONVERTER

CROSS-REFERENCE TO PRIOR APPLICATIONS

This application is the U.S. National Phase application under 35 U.S.C. §371 of International Application No. PCT/IB2012/052004, filed on Apr. 20, 2012, which claims the benefit of U.S. Provisional Patent Application No. 61/478,098, filed on Apr. 22, 2011. These applications are hereby incorporated by reference herein.

BACKGROUND OF THE INVENTION

1. Field of the Invention

The invention relates to a PFC converter and more particularly to an internal power supply circuit for buck-boost power factor correction (PFC) converter.

2. Description of the Related Art

PFC converters are utilized to improve the power factor of AC power. An important consideration in the design of power converters is that a power converter should provide a high power factor. The power factor of power converters generally refers to the ratio of the true power to the product of the voltage and current in the circuit. A high power factor is one which approximates or exceeds 0.9, with the maximum power factor being 1.0. For example, in an electric powered device, a load with a low power factor draws more current than a load with a high power factor for the same amount of useful power transferred.

Solid-state PFC controllers are also known and have been designed for each of the principal switch-mode power converter topologies: buck, boost, and buck-boost. In general, buck-derived circuits, including buck-boost circuits, interrupt the line input current, while boost-derived circuits do not.

Buck-boost power converters are also generally well-known in the art: a buck (step-down) converter followed by a boost (step-up) converter. The output voltage is of the same polarity as the input, and can be lower or higher than the input. Such a non-inverting buck-boost converter may use a single inductor that is used as both the buck inductor and the boost inductor.

Such conventional buck-boost power converters include an internal power supply circuit that usually consists of an auxiliary winding of PFC inductor, a charge pump circuit and a linear voltage regulator. A major limitation of such internal power supply circuits in the buck-boost PFC converters is that the voltage after the charge pump includes a high ripple voltage with a frequency of double main input frequency. A consequence of this high ripple voltage is that it causes the linear voltage regulator to have a high power loss and thus to be less cost effective.

A need exists for a power factor correction circuit that avoids limitations of prior art circuits. In particular, a need exists for an internal power supply circuit for the buck-boost PFC converter that eliminates or reduces the ripple voltage to allow the voltage after the linear voltage rectifier to be linear to DC bus voltage (output of the buck-boost PFC converter) at steady state. A smaller or eliminated voltage ripple will improve the power loss factor in linear voltage regulator and allow the buck-boost PFC converter to be more cost effective.

The present invention addresses such needs.

BRIEF SUMMARY OF THE INVENTION

The present invention provides aspects for a power converter with power factor correction circuit that removes or reduces the voltage ripple found in conventional PFC converters.

One aspect of the invention relates to a buck-boost PFC converter including an inductor having a winding and a first auxiliary winding and a second auxiliary winding, a peak voltage rectifier connected to the first and second auxiliary windings and a voltage regulator being coupled to the peak voltage rectifier.

Another aspect of the present invention relates to PFC converter including a voltage rectifier circuit and a voltage regulator circuit. The PFC converter also includes an inductor having a multiple auxiliary windings connected to the voltage rectifier circuit and the voltage regulator circuit. One of the auxiliary windings is arranged to supply a start up voltage, during a start up stage, using the voltage rectifier circuit to the voltage regulator circuit. Another of the auxiliary windings is arranged to supply a voltage, during a steady-state stage, using the voltage rectifier circuit to the voltage regulator circuit.

Yet another aspect of the present invention relates to a method for achieving power factor correction in a buck-boost PFC converter having a buck transistor, a boost transistor and a voltage regulator. The method includes the steps of controlling a voltage at the voltage regulator to be substantially linear as compared to an output DC voltage of the buck-boost PFC converter when both the buck transistor and the boost transistor are in an off state. The method also includes the step of controlling a voltage at the voltage regulator so that a threshold voltage for the buck-boost PFC converter is met during a start stage when both the buck transistor and the boost transistor are in an on state.

One object of various embodiments of the present invention is to improve the power loss factor in linear voltage regulator of a PFC converter.

Another object of various embodiments of the present invention is to improve the cost effectiveness of a buck-boost PFC converter.

The foregoing embodiments and other embodiments of the present invention as well as various features and advantages of the present invention will become further apparent from the following detailed description of various embodiments of the present invention read in conjunction with the accompanying drawings. The detailed description and drawings are merely illustrative of the present invention rather than limiting, the scope of the present invention being defined by the appended claims and equivalents thereof.

BRIEF DESCRIPTION OF THE DRAWINGS

FIG. 3 shows an exemplary embodiment of a PFC circuit in accordance with the present invention.

FIG. 4 shows a theoretical Waveform output from the PFC circuit configuration shown in FIG. 3

DETAILED DESCRIPTION OF THE INVENTION

The following description is of the best-contemplated modes of carrying out the present invention. This description is made for the purpose of illustrating the general principles of the invention and should not be taken in a limiting sense. The scope of the invention is best determined by reference to the appended claims.

Figure 1:
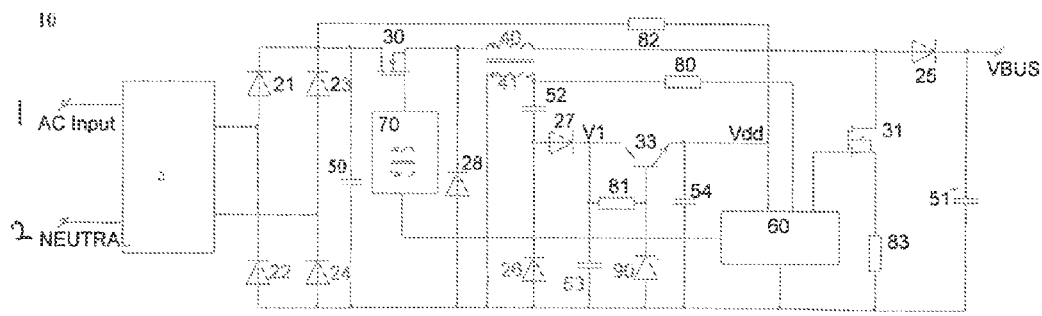
FIG. 1 shows a conventional PFC circuit configuration.

FIG. 1 shows a typical cascaded buck boost Power Factor Correction (PFC) circuit 10 which includes a conventional buck converter cascaded with a boost topology. In this topology, the output voltage can be lower or higher than the peak input voltage. Depending on the input voltage, the duty cycle is varied accordingly. So when the output voltage is less than the input voltage, the circuit operates as a buck converter and when the output voltage is greater than the input voltage, the circuit operates as the boost converter.

The circuit 10 includes an electromagnetic interference (EMI) filter 3, bridge diodes (21-24), a buck MOSFET 30, a PFC inductor 40, a boost MOSFET 31, a resistor 83, capacitors 50 and 51, diodes 25 and 28, and a PFC controller 60. The MOSFETs 30 and 31 are controlled by the PFC controller 60 and are controlled to turn On/Off at same time. The MOSFET 30 is driven through a driving circuit 70.

The circuit 10 in FIG. 1 also includes an auxiliary winding 41 of PFC inductor 40, resistor 80, a charge pump circuit (capacitor 52 and 53 and diodes 26, 27) and a linear voltage regulator (resistor 81, zener diode 90, transistor 33 and capacitor 54).

In operation, when voltage is applied to input terminals 1 and 2, current via resistor 82 charges the capacitor 54. When a voltage at Vdd (i.e., the voltage of capacitor 54) reaches a start threshold, the PFC controller 60 starts to oscillate and drive the MOSFETs 30 and 31. The circuit 10 then starts to provide a high enough voltage before the voltage at Vdd drops below a stop threshold voltage of the PFC controller 60.

Since the circuit 10 has the charge pump circuit in front of the linear voltage regulator, the Voltage at V1 (output of charge pump circuit) is linear to a peak-peak voltage of the auxiliary winding 41 of PFC inductor 40. When the MOSFETs 30 and 31 are ON (i.e., active mode or conductive mode), the voltage of the auxiliary winding 41 is a negative polarity (diode 26 is ON (forward bias)). The negative voltage equals to the input voltage divided by the inductor 40 turns ratio, e.g., n=N(inductor 40)/N(auxiliary winding 41), $$Vn = \frac{Vin}{n}$$

Vin=480√2|sin(2πft)| (for example when Vin=480V input AC and f=60 Hz)

When the MOSFETs 30 and 31 are off (nonconductive mode), the voltage of the auxiliary winding 41 is a positive polarity.

$$Vp = \frac{Vbus}{n}$$

The output (V1) of charge pump circuit equals:

$$V1=Vn+Vp=1/n\{Vbus+480\sqrt{2}|\sin(2\pi ft)|\}$$

Figure 2:
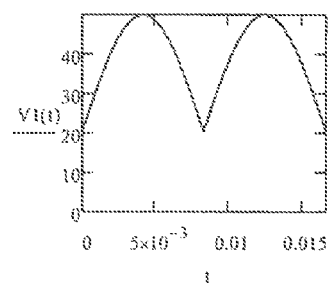
FIG. 2 shows a theoretical Waveform output from the conventional PFC circuit configuration shown in FIG. 1

The theoretical Waveform is shown in FIG. 2. In FIG. 2, the x-axis is time and the y-axis is voltage output at V1.

At zero cross of input voltage, Vin=0, then Vn=0, $$V1min = Vp = \frac{Vbus}{n}$$

At peak of Input, Vin=679V, then $$Vn = \frac{679}{n}$$

$$V1max = Vp + Vn = (679/n + Vbus/n)$$

So the ripple voltage will be ΔV1=V1max−V1min, $$\Delta V1 = \frac{679}{n}$$

If a minimum voltage drop on transistor 33 is VQ3min then a minimum voltage at V1 is VQ3min+Vdd. For example, if Vdd=16V, VQ3min=4V, then V1min=16V+4V=20V as shown in FIG. 2. Then the turns ratio n will be 23 (in this example, Vbus=460, n=Bus/V1min). a maximum voltage will be 50V (679+460)/23=49.5V and a calculated average voltage at V1 is 39V.

An average voltage across the transistor 33's collector and emitter is VceQ3=39−16=23V. If we assume the total current for the PFC controller 60 and the driving circuit 70 is 20 mA, then the power loss in the transistor 33 is P(transistor 33)=20 mA*23V=0.46 W. It should be noted that since the transistor 33 provides current to controller 60 and driving circuit, (current in resistor 82 is very small only for starting). The current in transistor 33 is same as the total current of PFC controller 60 and driving circuit 70 (i.e., 20 mA).

As will be understood by one of ordinary skill in the art, this amount of power loss is considered high for a transistor.

FIG. 3 shows an exemplary embodiment of a buck-boost PFC converter 100 in accordance with various aspects of the present invention. The converter 100 in FIG. 3 has various elements that are the same as shown in FIG. 1. These elements will not be discussed in detail again.

However, as discussed in detail below, different aspects of the converter 100 include the elements and configuration of an internal power supply. The internal power supply includes auxiliary windings 141 and 142 of an inductor 140, a peak voltage rectifier (diodes 126 and 127 and capacitor 153) and a voltage regulator (resistor 81, zener diode 90, transistor 33 and capacitor 54).

As shown in FIG. 3, one embodiment of the present invention includes the configuration of the auxiliary windings 141 and 142 and the peak voltage rectifier. In particular, the inductor 140 includes a second auxiliary winding (142) with one terminal connected to one terminal of the auxiliary winding 141. Anode terminals of the diodes 126 and 127 are connected to the other respective terminals of the auxiliary windings 141 and 142 and cathode terminals of the diodes 126 and 127 are connected to the non-control (i.e., not the base or gate) terminal of the transistor 33 and capacitor 153. In the embodiment of FIG. 3, the non-control terminal of the transistor 33 is the collector terminal.

It should be understood by one skilled in the art that while particular types of components are showed in the embodiment of FIG. 3, other types of components may be also be used. For example, while the MOSFETs 30 and 31 are shown as N-channel, enhancement mode MOSFETs other types of transistors may also be suitable. It should also be understood that the buck-boost PFC converter 100 may be used to supply power to various types of electric powered devices, e.g., solid-state LED, other type of lighting systems and electronic equipment. Various embodiments and aspects of the present invention can also be used in high input switching mode power supply, LED drivers, and HID lamp drivers. It should further be understood that the various embodiment also may be used with other types of switch-mode power converter topologies, e.g., buck and boost.

In operation, when MOSFETs 30 and 31 are OFF, a voltage on inductor 140 makes diode 127 ON (forward bias) and diode 126 OFF (reverse bias). As a result, a voltage at V1 is linear to output voltage DC bus (VBUS) voltage.

If turn ratio from inductor 140 to auxiliary winding 141 is: n1=N(inductor 140)/N(auxiliary winding 141), then a positive voltage from diode 127 is $$Vp = \frac{Vbus}{n1}$$

Since diode 127 and capacitor 153 act as a peak voltage rectifier and Vbus is almost a constant value during steady state, the voltage at V1 from diode 127 is:

$$V1 = Vp = \frac{Vbus}{n1}$$

When the buck-boost PFC converter 100 is working in steady state, the peak voltage rectifier (formed by diode 127 and capacitor 153) form an improved design for an internal power supply for the buck-boost PFC converter 100.

For example, if Vbus=460V, n1=23, then V1=20V. Also, as in the previous example discussed in connection with FIG. 1 for the circuit 10, Vdd=16V and the total current for the PFC controller 60 and the driving circuit 70 is assumed to be 20 mA. An average voltage across the transistor 33's collector and emitter is Vce=V1−Vdd=(20−16)=4V. The power loss is:

$P(\text{transistor } 33) = Vce*20 \text{ mA} = 0.08 \text{ W}.$

Comparing this power loss to the power loss in the conventional circuit 10, it can be seen that it is significantly reduced.

But the a buck-boost PFC converter 100 described above using the peak voltage rectifier (diode 127 and capacitor 153) has a disadvantage in that during the power on process, before Vbus is established, the voltage at V1 will be low. This low voltage at V1 may cause the buck-boost PFC converter to have difficulty to start. In order to solver the issue, diode 126 and the second auxiliary winding 142 are added as shown in FIG. 3. The diode 126 and the second auxiliary winding 142 are configured to control the voltage (V1) at the collector of transistor 33 so that a start-up threshold voltage of the PFC control unit is met at start up.

If turn ratio from the inductor 140 to the second auxiliary winding 142 is: n2=N(inductor 140)/N(auxiliary winding 142). When MOSFETs 30 and 31 are on (active mode), diode 126 is ON (forward bias), diode 127 is Off (reverse bias), then the voltage at V1 from diode 126 is $$V1 = \frac{Vin}{n2} = \frac{480\sqrt{2} \cdot |\sin(2 \cdot \pi f \cdot t)|}{n2}.$$

For example, if we again assume that n1=23 and that n2=20 considering lowest input voltage, the voltage waveform at V1 during the starting process and steady state is shown in FIG. 4. In FIG. 4, the x-axis is time and the y-axis is the voltage output at V1 of FIG. 3. As shown in FIG. 4, the voltage waveform at V1 reaches the steady state slightly after about 0.04 seconds before that time it is in a start up stage. Based upon this, it can be seen that the average voltage within full cycle is 25.5V, the voltage across transistor 33 is VceQ3= (25.5−16)=9.5V. In FIG. 3, this results in a power loss in transistor 33 that is 9.5×20 mA=0.19 W.

When compared to the conventional circuit 10 in FIG. 1, the power loss in transistor 33 in FIG. 3 is reduced to less than half of in the charge pump circuit (capacitor 52 and 53 and diodes 26, 27) of FIG. 1.

In summary, as described, embodiments of the present invention for a buck-boost PFC converter provide for reduced power loss, increases efficiency, and/or are more cost effective as compared to conventional buck-boost PFC converters.

Referring to FIGS. 3-4, those having ordinary skill in the art will appreciate numerous advantages of the present invention including, but not limited to, an improved buck-boost PFC converter of a switch mode power supply. Additionally, those having ordinary skill in the art will further appreciate how to apply the inventive principles of the present invention to other forms of switch mode power supplies in accordance with the present invention based on the exemplary buck-boost PFC converter shown in FIG. 3.

While the embodiments of the present invention disclosed herein are presently considered to be preferred, various changes and modifications can be made without departing from the spirit and scope of the present invention. The scope of the present invention is indicated in the appended claims, and all changes that come within the meaning and range of equivalents are intended to be embraced therein.

What is claimed is:

1. A power factor correction (PFC) converter comprising:
   an inductor having a primary winding and at least two series connected auxiliary windings;
   a voltage rectifier coupled to the at least two auxiliary windings; and
   a voltage regulator coupled to the voltage rectifier,
   wherein during a start-up stage, one of the at least two auxiliary windings supplies a start-up voltage to the voltage regulator circuit via the voltage rectifier circuit, and during a steady-state stage another of the at least two auxiliary windings supplies a steady-state voltage, and wherein the start-up voltage is controlled to meet a start-up threshold voltage.

2. The PFC converter according to claim 1, wherein the voltage rectifier includes:
   a capacitor; and
   first and second diodes connected in parallel between the first and second auxiliary windings and the capacitor.

3. The PFC converter according to claim 2, wherein anodes of the first and second diodes are connected to the first and second auxiliary windings and cathodes of the first and second diodes are connected to the capacitor.

4. The PFC converter according to claim 2, wherein the voltage regulator includes a transistor having a non-control terminal coupled to a connection between the first and second diodes and the capacitor.

5. The PFC converter according to claim 4, further comprising a PFC control unit coupled to the voltage regulator, wherein the start-up voltage (V1) is controlled at the non-control terminal so that the start-up threshold voltage of the PFC control unit is met at start up.

6. The PFC converter according to claim 1, wherein the PFC converter is a buck-boost PFC converter.

7. The PFC converter of claim 6, wherein the buck-boost PFC converter further includes a rectifier bridge coupled to an AC input voltage signal line.

8. The PFC converter of claim 7, wherein the buck-boost PFC converter is coupled to a lighting system.

9. The PFC converter of claim 8, wherein the lighting system includes solid-state lighting components.

10. A method for achieving power factor correction in a buck-boost PFC converter having a buck transistor, a boost transistor and a voltage regulator, the method comprising the acts of:
    providing an inductor having a primary winding and at least two series connected auxiliary windings;

providing a voltage rectifier coupled to the at least two auxiliary windings;
coupling the voltage regulator to the voltage rectifier;
when both the buck transistor and the boost transistor are in an off state, controlling a voltage at the voltage regulator to be substantially linear as compared to an output DC voltage of the buck-boost PFC converter; and
when both the buck transistor and the boost transistor are in an on state, controlling a voltage at the voltage regulator so that a threshold voltage for the buck-boost PFC converter is met during a start stage and the power factor is corrected,
wherein the voltage rectifier includes:
a capacitor; and
first and second diodes connected in parallel between the first and second auxiliary windings and the capacitor.

11. A PFC converter comprising:
a voltage rectifier circuit;
a voltage regulator circuit coupled to the voltage rectifier circuit; and
an inductor having a primary winding and a plurality of auxiliary windings coupled to the voltage rectifier circuit for supplying voltage to the voltage regulator circuit via the voltage rectifier circuit,
wherein one of the plurality of auxiliary windings is configured to supply a start up voltage to the voltage regulator circuit during a start up stage, using the voltage rectifier circuit, and
wherein the PFC converter is a buck-boost PFC converter.

12. The PFC converter according to claim 11, wherein another of the plurality of auxiliary windings is configured to supply a steady-state voltage to the voltage regulator circuit during a steady-state stage, using the voltage rectifier circuit.

13. The PFC converter according to claim 12, wherein the steady-state voltage is substantially linear as compared to an output DC voltage of the PFC converter.

14. The PFC converter of claim 11, wherein the PFC converter is coupled to a lighting system including solid-state lighting components.

* * * * *